United States Patent

Shaumian

[11] 3,826,162
[45] July 30, 1974

[54] MULTISPINDLE AUTOMATIC MACHINE TOOL

[76] Inventor: Grigor Arutjunovich Shaumian, Ananievsky pereulok 5, kv. 63, Moscow, U.S.S.R.

[22] Filed: June 29, 1973

[21] Appl. No.: 374,953

[52] U.S. Cl. .................................. 82/3, 29/38 A
[51] Int. Cl. ........................................... B23b 9/06
[58] Field of Search .................. 82/3; 29/38 A, 38 B

[56] References Cited
UNITED STATES PATENTS

| 1,782,138 | 11/1930 | Davis et al. | 82/3 X |
| 2,016,570 | 10/1935 | Adams | 82/3 X |
| 2,385,605 | 9/1945 | Bullard et al. | 29/38 A |

Primary Examiner—Leonidas Vlachos
Attorney, Agent, or Firm—Eric H. Waters

[57] ABSTRACT

Article-supporting spindles rotatable at a cutting speed from the main drive are mounted on a rotor associated with an angular feed drive and uniformly angularly spaced on this rotor. The cutters associated with radial abutments are mounted in cutter blocks rigidly mounted on the framework of the machine tool and are also uniformly angularly spaced about the rotor. The angular spacing of the cutter blocks is different from the angular spacing of the spindles by a value which is a multiple of the ratio of the angle of engagement of the cutter with an article at working of the latter to the number of the cutter blocks, whereby in operation of the machine tool the angular feed of the rotor brings successive articles into contact with the cutters in sequential fashion.

The multispindle machine tool can be successfully employed for working various articles shaped as bodies of rotation, where requirements as to the accuracy of the size and shape of the articles, as well as to their surface finish are particularly strict.

3 Claims, 3 Drawing Figures

MULTISPINDLE AUTOMATIC MACHINE TOOL

The invention relates to metal working machine tools, and, more particularly, it relates to multispindle automatic machine tools for working of articles shaped as bodies of rotation.

The invention can be widely employed at working of various articles, particularly such as rings, sleeves, flanges, etc. made of various metals and non-metal materials, where the requirements as to the accuracy of the size and shape of the articles, as well as to the quality of their surface finish are particularly severe.

There has been already disclosed a multispindle automatic machine tool for working of articles shaped as bodies of rotation, wherein the cutters associated with radial abutments are mounted in multi-cutter blocks rigidly mounted on the framework of the machine tool and uniformly angularly spaced about a rotor associated with an angular feed drive and carrying thereon a plurality of article-supporting spindles, also uniformly angularly spaced on the rotor, the apindles being rotatable from the main drive of the machine tool at a cutting speed.

In this known multispindle automatic machine tool the angular spacing of the cutter blocks on the framework is equal to the angular spacing of the article-supporting spindles on the rotor.

This design means that all the article-supporting spindles engage simultaneously the respective cutters. Therefore, working of all the articles commences at the same moment. Owing to this simultaneous commencement of the working of every article, the cutting effort and the power consumed by this effort attain their maximum value simultaneously at every spindle. Therefore, the total load of the machine tool rises several times. This is reflected in certain dynamic unbalance in the "tool - spindle - rotor" system, which might affect the quality of the working of the articles. Furthermore, the multiplied load necessitates the use of a more powerful motor of the main drive of the machine tool.

However, after having attained the abovementioned maximum value, the load drops to zero at continuing rotation of the rotor, which means that the power required drops to the idling power.

With the great installed power of the drive motor (which is necessitated by the total load) all the drive mechanisms, in order to provide smooth motion, should be selected to correspond to the multiplied power of the motor. Therefore, the factor of utilization of the power of the selected motor is bound to be relatively low.

This results in unnecessarily increased dimensions of the machine tool and its higher cost.

Should any one of the cutters associated with rigid abutments get broken in operation, the allowance that should have been removed by this broken cutter remains on the article. This unremoved allowance is to be removed by the successive cutter of the same block. Therefore, the load of this last-mentioned cutter is doubled, since it has to remove its "own" allowance and the one unremoved by the previous broken cutter. While this double allowance is being removed, chances are that the cutter in question might get broken too, which evidently leads to every successive cutter in the block getting broken.

Any replacement of a broken cutter means downtime, which affects the output of the automatic machine tool.

Moreover, in the above described known automatic machine tool there is not provided a specific position in which the spindle-carrying rotor may be safely brought to a standtsill. When the rotor is stopped (whatever the reason for this stopping), those of the cutters which are actually engaged in the cutting operation are eventually broken.

All these disadvantages affect not only the quality of the articles worked, on account of the poor dynamic stability of the "cutting tool - spindle - rotor" system, but also the output of the machine tool.

It is the main object of the present invention to create a multispindle automatic machine tool for working of articles shaped as bodies of rotation, having such relative arrangement of the multi-cutter blocks on the framework of the machine tool and of the article-supporting spindles on the rotor thereof, which should provide for high dynamic stability of the entire "cutting tool - spindle - rotor" system.

It is another important object of the present invention to create an automatic machine tool of the abovespecified kind, which should offer high quality of the working of articles with substantial reduction, in comparison with the hitherto known automatic machine tool of a similar kind, of the requested power of the main drive of the machine tool.

It is not less important object of the present invention to create an automatic machine tool of the above specified kind, which should offer high output.

These and other objects are attained in a multispindle automatic machine tool of the herein disclosed type for working of articles shaped as bodies of rotation, wherein, in accordance with the present invention, the multi-cutter blocks are arranged on the framework of the machine tool with an angular spacing that is different from the angular spacing of the article-supporting spindles by a value which is a multiple of the ratio of the angle of engagement of a single cutter with an article at working of the latter to the number of the multi-cutter blocks.

Owing to this relative arrangement of the multi-cutter blocks on the framework of the machine tools and of the spindles on the rotor, the angular feed of the rotor brings the articles into engagement with the cutters of the multi-cutter blocks in a sequential fashion, thus providing for a high dynamic stability of the entire "cutting tool - spindle - rotor" system, which ensures high-quality working of the articles.

Furthermore, sequential engagement of the articles being worked with the cutters of the multi-cutter blocks provides for more uniform loading of the main drive motor, which brings down the amount of power consumed by the machine tool and steps up the factor of utilization of the power of the motor, and that without affecting the high output of the machine tool.

It is advisable that in the multi-cutter blocks rigidly mounted on the framework each cutter should be associated with a stand-by cutter having its own radial abutment and displaced radially of the rotor in respect of its "main" cutter by a value of the permissible wear of this main cutter, the radial abutment of each said cutter being in the form of a positively rotatable cam having respective cam fields for rough and fine setting of the cutter in this radial direction.

The last-decribed design feature of the herein disclosed machine tool eliminates the possibility of a double load being applied to a single cutter, which fact further provides for stable loading of the main drive motor.

Besides, the provision of the radial abutments of the abovespecified kind enables to replace cutters without stopping the rotor, because the fine setting cam fields of these abutments make it possible to effect smooth feeding of the cutter into the article being worked in the course of rotation of the rotor, without affecting the high dynamic stability of the entire system "cutting tool - spindle - rotor."

It is likewise advisable that in the multi-cutter blocks the last or trailing in the direction of rotation of the rotor one of the cutters in one block and the first or leading cutter of the successive block should be angularly spaced by an angle which is in excess of the doubled value of the angle of engagement of a single cutter with an article at working of the latter.

With this arrangement of the cutters the machine tool has operative positions at which the rotor and the spindles can be stopped out of engagement of the articles with the cutters, which eliminates the eventuality of the cutters getting broken at the moment of stopping of the machine tool, and this, undoubtedly, favorably influences the dynamic stability of the system "cutting tool - spindle - rotor."

The present invention will be described hereinbelow in connection with an embodiment thereof, with reference being had to the appended drawings, wherein.

Figure 1:
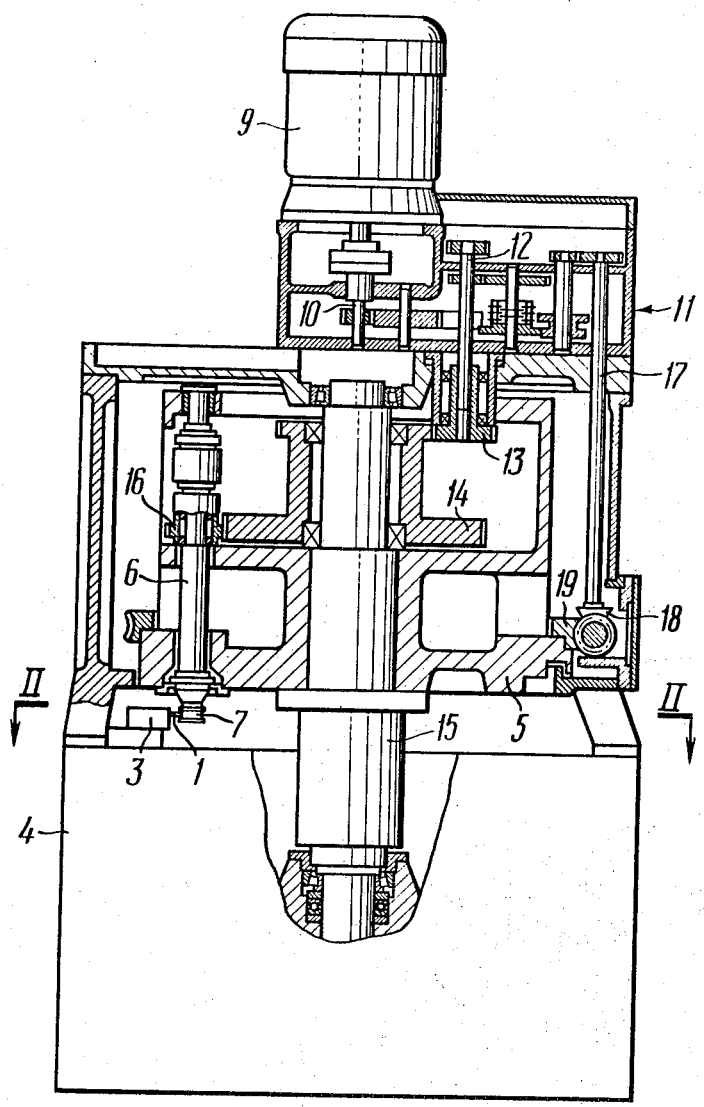
FIG. 1 is a longitudinally sectional schematic view of a multispindle automatic machine tool constructed in accordance with the present invention, wherein articles are worked in two parallel streams.
Figure 2:
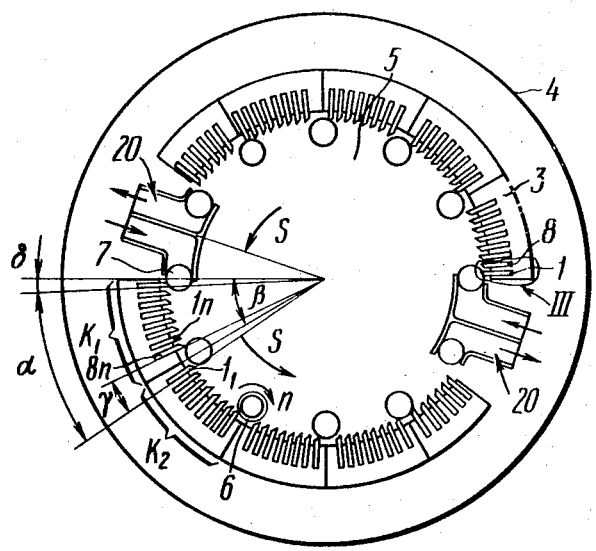
FIG. 2 is a sectional view along line II—II of FIG. 1.

Referring now is particular to the appended drawings, there is hereinafter disclosed multispindle automatic machine tool for working articles shaped as bodies of rotation, wherein cutters 1 (FIGS. 1 and 2) are associated with radial abutments 2 (FIG. 3) and are mounted in multi-cutter blocks 3 which are rigidly supported by the framework 4 (FIG. 1) of the machine tool, the blocks 3 being uniformly angularly spaced about a rotor 5, the angular spacing equalling $\alpha$ (FIG. 2). The rotor 5 carries thereon a plurality of uniformly angularly spaced spindles 6 adapted to support in operation articles 7 being worked, the angular spacing equalling $\beta$. The rotor 5 is associated with a drive system effecting its rotational angular feed. The spindles 6 are rotatable in operation at a speed defining the speed of cutting, from the main drive of the machine tool, which is also operatively connected with the drive effecting angular feed of the rotor 5.

In accordance with the present invention the cutter blocks 3 are spaced on the framework 4 at an angular spacing $\alpha$ which is different from the spacing $\beta$ of the article-supporting spindles 6 on the rotor 5 by a value which is a multiple of the ratio of the angle $\delta$ of engagement of a single cutter 1 with an article 7 at working of the latter to the number $K$ ($K = K_1 + K_2 + \ldots$) of the multi-cutter blocks 3.

In the present disclosure the angle $\delta$ of engagement of a cutter with an article at working of the latter is the angle of rotation of the rotor 5 carrying the spindles 6 with articles 7, through which the cutter removes "its" allowance from the article.

Figure 3:
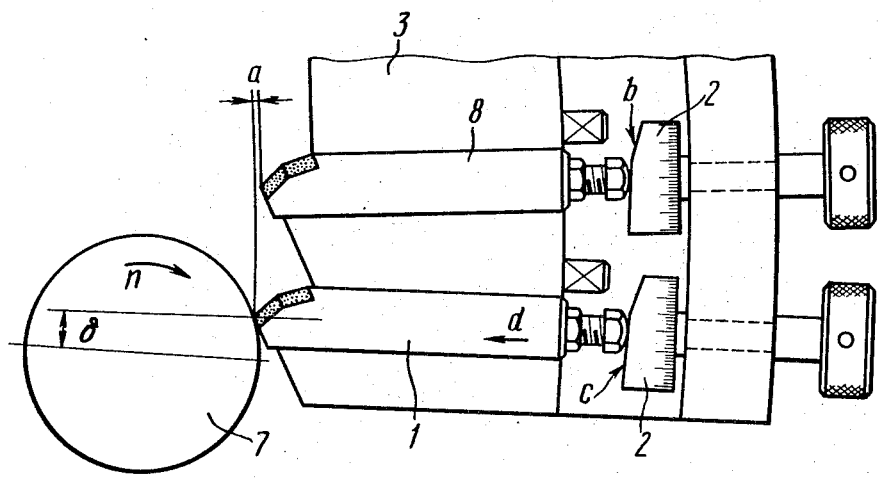
FIG. 3 is an enlarged view of a portion III of the multi-cutter block, as shown in FIG. 2.

According to another feature of the present invention, in the cutter blocks 3 each cutter 1 is associated with a stand-by cutter 8 (FIG. 3) with its own radial abutment 2, the stand-by cutter 8 being displaced radially of the rotor 5 relative to "its" main cutter 1 by a distance "a" which is the value of permissible wear of this main cutter, each radial abutment 2 associated either with a main cutter 1 or with a stand-by cutter 8 being in the form of a positively rotatable cam having fields "b" and "c," respectively, for rough and fine setting of the respective cutter in the abovementioned radial direction which is indicated in FIG. 3 with an arrow line "d."

According to yet another feature of the present invention, in the multi-cutter blocks 3 the last or trailing (in the direction of rotation of the rotor 5) cutter $1_n$ (or else, if the stand-by cutters are provided, it is the cutter $8_n$) in one block $K_1$ and the first or leading cutter 1 of the successive cutter block $K_2$ are spaced by an angle $\gamma$ which is in excess of the doubled value of the angle $\delta$ of engagement of a single cutter 1 with an article 7 at working of the latter.

The main drive of the machine tool includes an electric motor 9 (FIG. 1) of which the shaft is fast with the input shaft 10 of a gearbox 11. The first output shaft 12 of the gearbox 11 carries a gear 13 which meshes permanently with a central gear 14 rotatable about the shaft 15 of the rotor 5, journalled in the framework 4. This gear 14 transmits rotation defining the speed of cutting to the spindles 6 through respective pinions 16 fast with these spindles and permanently meshing with this central gear 14.

Rotation of the rotor 5, defining its angular feed, is effected from another output shaft 17 of the gearbox 11 through a bevel gear couple 18 and a worm gear couple of which the worm wheel 19 is fast with the rotor 5.

Other, not less important members and assemblies of the herein disclosed machine tool, such as the article handling system (i.e. means for automatic loading of articles onto the spindles and unloading them therefrom), a shaving removing mechanism, cooling and lubricating system, etc., which form no immediate part of the present invention, are not dealt with in the present disclosure and are not shown in the appended drawings, for the sake of clarity.

The herein disclosed multispindle automatic machine tool operates, as follows.

In the presently described embodiment articles are worked by the multispindle machine tool in two parallel streams, i.e. the machine tool is equipped with tow diametrally opposing loading-unloading stations 20 (FIG. 2) in which either loading or unloading of two articles is effected simultaneously. Intermediate of these two loading-unloading stations 20 there are mounted on the framework 4 two sets of multi-cutter blocks 3, each set performing complete specified machining of an article, as the rotor is rotated through 180°.

The cutter blocks 3 (in each one of the two sets) are uniformly spaced on the framework 4 at angular spacing $\alpha$ which is greater than the spacing $\beta$ of the spindles 6 about the rotor 5 by a value which is a multiple of an angle $\delta/K$ where $\delta$ is the angle of engagement of a single cutter with an article at working of the latter, and $K$ is the number of the multi-cutter blocks 3 in each set of the two article-working streams. This angular difference $\delta/K$ between the angles $\alpha$ and $\beta$ ensures that the moments at which working of successive articles is commenced are staggered relative to one another.

When the cutter blocks are positioned on the framework in the abovedescribed manner relative to the spindles 6 of the rotor 5, the blocks are secured on the framework 4, and the motor 9 is started. The motor 9 drives the input shaft 10 of the gearbox 11, and the output shaft 12 of the latter transmits rotation through the gear 13, the central gear 14 and the pinions 16 to the respective spindles 6 which are thus rotated in a direction "$n$" at a speed defining the speed of cutting.

At the same time the other output shaft 17 of the gearbox 11 drives through the bevel gear couple 18 and the worm gear couple with the worm wheel 19 the rotor 5 in a direction "$s$" at a speed defining the angular feed of this rotor.

As the rotor 5 is thus rotated, at the respective station 20 an article 7 (FIG. 2) is secured by any known suitable means on a spindle 6 (FIG. 1). As the rotor 5 continues its rotation, the article 7 engages the cutter 1 (FIG. 2) of the respective multi-cutter block 3 ($K_1$), and working of the article commences. As the article is carried past the cutters of the first cutter block $K_1$, a successive article is loaded at the station 20 upon the successive spindle spaced from the previous one by the angle $\beta$.

At this second article engages the cutter 1 of the first cutter block $K_1$, the first article has not yet engaged the first cutter of the second cutter block $K_2$, on account of the difference between the angles $\beta$ and $\alpha$, which difference is a multiple of the value $\delta/K$. This specific feature of the operation of the herein disclosed machine tool is true in the case of every successive spindle supporting the articles to be worked, which latter thus engage the cutters in a sequential fashion.

Owing to this sequential fashion of engagement of the articles being worked with the cutters, the total cutting effort present in the "cutting tool - spindle - rotor" system would not differ substantially from the cutting effort of cutting of a single article by a single cutter.

In this way the dynamic stability of the machine tool, as a whole, is considerably improved, and the quality of working of the articles is likewise improved, i.e. there is a greater accuracy of cutting of the articles to a specified size, shape and surface finish.

Furthermore, the power requirements of the main drive of the machine tool are considerably reduced, as compared with the known automatic machine tools of a similar kind, this power requirements substantially approximating those of working of an article with a single cutter.

It is as important, in order to attain high dynamic stability of the "cutting tool - spindle - rotor" system, i.e. to ensure high accuracy working of the articles, that the cutting effort should be substantially permanent, which is provided for by associating each cutter in each cutter block with a stand-by cutter. As a "main" cutter either wears away or eventually gets broken, the stand-by cutter comes into operation. This last-mentioned feature helps to maintain permanent power consumption by the main drive motor, as well as a high output of the machine tool.

To effect setting of a cutter (be it a main cutter or a stand-by one), i.e. to adjust the cutter radially of the rotor into a required cutting position, the cam of the respective radial abutment 2 (FIG. 3) is rotated so that its rough setting ("$b$") and fine setting ("$c$") fields successively displace the cutter.

Thus, when displaced by the rough setting field "$b$" of the cam of the respective radial abutment, the cutter is quickly brought near the article being worked, but not into engagement therewith. As the cam is rotated further on, the fine setting field "$c$" slowly displaces the cutter into the cutting position of the latter, in which way it is possible to replace and adjust a cutter without the necessity of stopping the machine tool, which is another feature providing for high dynamic stability of the entire "cutting tool - spindle - rotor" system.

It is now clear that the machine tool operates continuously.

However, as it has been already explained hereinabove, the herein disclosed machine tool has certain positions determined by the fact that in the multi-cutter blocks 3 the last or trailing cutter (in the direction of rotation of the rotor 5) $1_n$ or $8_n$, if the stand-by cutters are provided, of one such block $K_1$ and the first or leading cutter $1_1$ of the successive block $K_2$ are spaced by an angle $\gamma$ which is greater than the doubled angle $\delta$ of engagement of a single cutter with an article at working of the latter.

Therefore, when the herein disclosed automatic machine tool is to be stopped, the rotor is arrested in a position at which all the spindles are so located that the articles supported thereon are free from engagement with the cutters, in which way breaking of the cutters is positively prevented, and the dynamic stability of the "cutting tool - spindle - rotor" is unaffected. Arresting of the rotor of the herein disclosed automatic machine tool in exactly these positions can be ensured by any suitable known means, as those competent in the art cannot fail to comprehend, e.g. by corresponding provisions in the electric circuitry of the machine tool, which is not described here, as it forms no part of the present invention.

Owing to its high dynamic stability, a multispindle automatic machine tool constructed in accordance with the present invention may be successfully employed for machining of articles shaped as bodies of rotation, such as various rings, sleeves, bushings, flanges, etc. which are to meet strict requirements concerning the accuracy of their shape, size and surface finish.

The herein disclosed machine tool combines a high output with a stable quality of the articles it turns out; its operation is characterized by economy and convenience.

What is claimed is:

1. A multispindle automatic machine tool for working of articles shaped as bodies of rotation, comprising: a framework; a main drive; a rotor journalled for rotation on said framework and associated with a drive adapted to effect rotational angular feed of said rotor, operatively connected with said main drive; article-supporting spindles mounted on said rotor at uniform angular spacing, rotatable from said main drive at a speed defining the speed of cutting; cutters associated with radial abutment means arranged in multi-cutter blocks, said multi-cutter blocks being rigidly mounted on said framework and uniformly angularly spaced about said rotor; said machine tool being characterized in that said angular spacing of said cutter blocks on said framework is different from said angular spacing of said article-supporting spindles on said rotor by a value which is a multiple of the ratio of the angle of engagement of a single said cutter with a single said article at working of the latter to the number of said cutter blocks, whereby in operation of said machine tool rotational feed of said rotor brings said articles into engagement with said cutters in a sequential fashion.

2. A multispindle automatic machine tool as claimed in claim 1, wherein in said cutter blocks each said cutter is associated with a stand-by cutter having its own said radial abutment means, said stand-by cutter being displaced radially of said rotor in relation to its said main cutter by a value of permissible wear of said main cutter; said radial abutment means of each said cutter includes a positively rotatable cam having fields, respectively one of said cutters in said radial direction.

3. A multispindle automatic machine tool as claimed in claim 2, wherein in said multi-cutter blocks that one of said cutters which is the last one in the direction of rotation of said rotor of one said block is angularly spaced from that one of said cutters which is the first one in said direction of rotation of said rotor of the successive one of said cutter blocks by an angle which is greater than the doubled value of said angle of engagement of a single said cutter with said article at working of the latter.

* * * * *